(12) United States Patent
Paul (10) Patent No.: US 9,098,267 B2
(45) Date of Patent: *Aug. 4, 2015

(54) ANALYSIS OF SHORT TERM CPU SPIKES IN AN OPERATING SYSTEM KERNEL

(71) Applicant: JUNIPER NETWORKS, INC., Sunnyvale, CA (US)

(72) Inventor: Vijay Paul, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 310 days.

This patent is subject to a terminal disclaimer.

(21) Appl. No.: 13/731,913

(22) Filed: Dec. 31, 2012

(65) Prior Publication Data

US 2013/0124837 A1 May 16, 2013

Related U.S. Application Data

(63) Continuation of application No. 12/709,955, filed on Feb. 22, 2010, now Pat. No. 8,365,187.

(51) Int. Cl.
*G06F 9/46* (2006.01)
*G06F 9/30* (2006.01)
*G06F 11/34* (2006.01)

(52) U.S. Cl.
CPC ........ *G06F 9/30076* (2013.01); *G06F 11/3466* (2013.01); *G06F 11/3409* (2013.01); *G06F 2201/81* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 5,742,825 A | 4/1998 | Mathur et al. | |
| 7,305,663 B1 * | 12/2007 | McGuire et al. | 717/130 |
| 2004/0075690 A1 * | 4/2004 | Cirne | 345/771 |
| 2011/0145838 A1 * | 6/2011 | de Melo et al. | 719/318 |
| 2011/0209158 A1 | 8/2011 | Paul | |

* cited by examiner

*Primary Examiner* — Emerson Puente
*Assistant Examiner* — Dong Kim
(74) *Attorney, Agent, or Firm* — Harrity & Harrity, LLP (57) ABSTRACT

A profiler may analyze processes being run by a processor. The profiler may include logic to periodically sample a value of an instruction pointer that indicates an instruction in the first process that is currently being executed by the processor and logic to update profile data based on the sampled value. The profiler may additionally include logic to determine, in response to a context switch that includes the operating system switching the active process from the first process to another of the plurality of processes, whether the first process executes for greater than a first length of time; logic to stop operation of the profiler when the first process executes for greater than the first length of time; and logic to clear the profile data when the first process fails to execute for greater than the first length of time.

20 Claims, 8 Drawing Sheets

ANALYSIS OF SHORT TERM CPU SPIKES IN AN OPERATING SYSTEM KERNEL

RELATED APPLICATION

This application is a continuation of U.S. patent application Ser. No. 12/709,955, filed Feb. 22, 2010, which is incorporated herein by reference.

BACKGROUND

A computing device, such as a personal computer or a network device, may include an operating system (OS) that provides an interface between hardware of the computing device and software processes that are executed by the computing device. The OS may particularly include a kernel, which may be a central component of the OS and may act as a bridge between the software processes and the actual data processing done at the hardware level. One of the kernel's responsibilities may include switching the active process between a number of possible processes. Switching between active processes may be performed at a fast enough rate so that the computing device may appear to be simultaneously executing the processes.

Some kernels may be preemptive kernels, which means that the kernel may interrupt an ongoing process and switch the current system context to another process. Other kernels may be non-preemptive. In a non-preemptive kernel, the kernel may wait for the process running in the current system context to relinquish control before switching to a different process. Preemptive kernels may more reliably guarantee that each running process will receive a regular "slice" of operating time. Non-preemptive kernels, in contrast, may be more efficient than preemptive kernels as less overhead may be required to switch process contexts.

In a non-preemptive kernel, it may be important to avoid processes that run for too long without relinquishing the processor. The presence of such processes can adversely impact the latency requirements of other processes. This can be particularly problematic with operating systems used in computing devices such as a network device (e.g., router, switch, and/or network security device), where excess latency can lead to protocol expiries and connection drops.

SUMMARY

One implementation is directed to a device that may include a processor and an operating system to schedule a first process of a group of processes as an active process that is executed by the processor. The device may further include a profiler to sample a value of an instruction pointer that indicates an instruction in the first process that is currently being executed by the processor; update profile data based on the sampled value; determine, in response to a context switch that includes the operating system switching the active process from the first process to another of the processes, whether the first process executes for greater than a first length of time; stop operation of the profiler when the first executes for greater than the first length of time; and clear the profile data when the first process fails to execute for greater than the first length of time.

Another implementation is directed to a method executed by a computing device. The method includes sampling, by the computing device, an instruction pointer that points to one of a plurality of instructions, in a first process of a group of processes, that is currently being executed by the computing device. The method may further include incrementing, by the computing device and in response to the sampling of the instruction pointer, a count value of a group of count values, where the count value represents a number of times the instruction pointer has been sampled when pointing to the one of the instructions; and determining, by the computing device and in response to a context switch that includes the computing device switching an active process from the first process to another process in the plurality of process, whether the first process executes for greater than a first length of time. The method may further include stopping, by the computing device, periodic sampling, when the first process executes for greater than the first length of time; and clearing, by the computing device, each of the count values when the first process executes for less than the first length of time.

Another possible implementation includes a network device that comprises a hardware portion to process packets received by the network device; a processor; a network operating system to control operation of the hardware portion and to schedule a first process of a group of processes as an active process that is executed by the processor; and a memory to store the processes, at least one of the processes including a profiler process. The profiler process may include instructions to sample a value of an instruction pointer that indicates an instruction in the first process that is currently being executed by the processor; update profile data based on the sampled value; determine, in response to a context switch that includes the network operating system switching the active process from the first process to another of the processes, whether the first process executes for greater than a first length of time; stop operation of the profiler when the first process executes for greater than the first length of time; and clear the profile data when the first process executes for less than the first length of time.

In yet another possible implementation, a device may include means for sampling an instruction pointer that points to one of a group of instructions, in a first process of a plurality of processes, that is currently being executed by the device; means for incrementing, in response to the sampling of the instruction pointer, a count value of a plurality of count values, where the count value represents a number of times the instruction pointer has been sampled when pointing to the one of the instructions; means for determining, in response to a context switch that includes the computing device switching an active process from the first process to another process in the group of processes, whether the first process executes for greater than a first length of time; means for stopping periodic sampling when the first process executes for greater than the first length of time; and means for clearing each of the count values when the first process execute for less than the first length of time.

BRIEF DESCRIPTION OF THE DRAWINGS

The accompanying drawings, which are incorporated in and constitute a part of this specification, illustrate one or more embodiments described here and, together with the description, explain these embodiments. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a profiler may analyze processes being executed by a processor to determine the relative processor usage of the various processes. The profiler may be particularly configured to only collect data on "long running" processes, such as kernel processes that use processor resources for a threshold period of time before giving control back to the operating system. Profile data may not be collected for processes that are not long running processes. In this manner, the collected profile data may include data only for the long running processes, which may make it easier to spot, analyze, and debug the long running processes.

Exemplary System Overview

Figure 1:
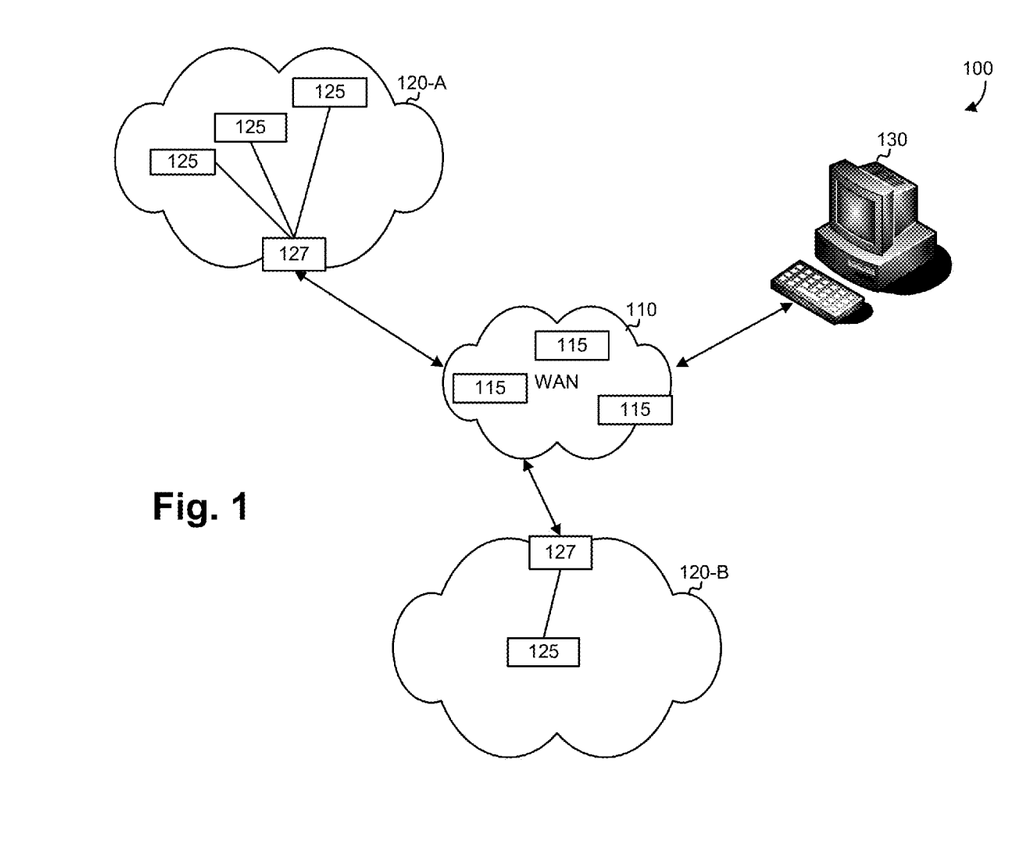
FIG. 1 is a diagram of an exemplary system in which concepts described herein may be implemented.

FIG. 1 is a diagram of an exemplary system 100 in which concepts described herein may be implemented. System 100 may include a wide area network (WAN) 110 connected to one or more private networks 120-A and 120-B (collectively referred to as private networks 120) and a computing device 130. Private networks 120 may each, for example, include corporate or individual local area networks (LANs).

WAN 110 may generally include one or more types of networks. For instance, WAN 110 may include a cellular network, a satellite network, the Internet, or a combination of these (or other) networks that are used to transport data. Although shown as a single element in FIG. 1, WAN 110 may include a number of separate networks that function to provide services to private networks 120 and computing devices, such as computing device 130. WAN 110 may be implemented using a number of network devices 115. Network devices 115 may include, for example, routers, switches, gateways, and/or other devices that are used to implement WAN 110.

Private networks 120 may each include a number of computing devices, such as, for example, client computing stations 125 and network devices 127. Client computing stations 125 may include computing devices of end-users, such as desktop computers or laptop computers. Network devices 127, similar to network devices 115, may include network devices used to implement private networks 120, such as firewalls, network acceleration devices, switches, routers, combinations of these devices, or other devices relating to network implementation, control, and/or security.

Network devices 115 and 127 may each implement a network operating system that controls the resources of the network device and provides an interface to the network device through which users can modify the configuration of the network device.

Computing device 130 may include, for example, a laptop or personal computer connected to WAN 110. Alternatively, computing device 130 may include a mobile device, such as a cell phone, etc.

In the exemplary system shown in FIG. 1, one WAN 110, two private networks 120-A and 120-B, and one computing device 130 are shown. In other implementations, system 100 may include additional, fewer, different, or differently arranged networks and/or devices. Additionally, in some implementations, tasks described as being performed by one device in FIG. 1 may be performed by a different one or more devices in FIG. 1.

Exemplary Device Architectures

Figure 2:
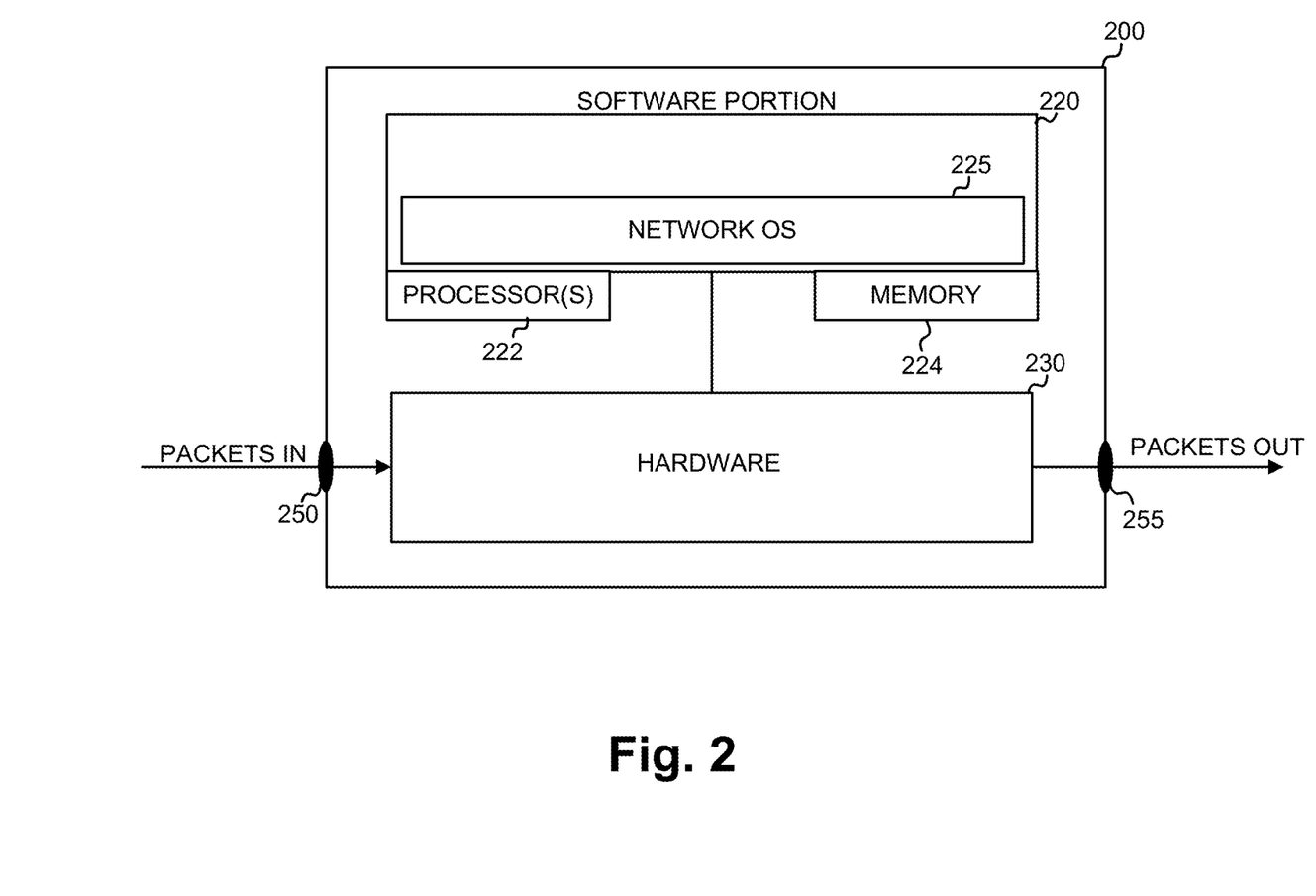
FIG. 2 is a block diagram of an exemplary network device corresponding to a network device shown in FIG. 1.

FIG. 2 is a block diagram of an exemplary network device 200, which may correspond to one of network devices 115 or 127. In order to increase throughput, network device 200 may use dedicated hardware to assist in processing incoming units of data, such as packets. In some alternative implementations, units of data (data units) other than packets may be used. As shown in FIG. 2, network device 200 may generally include a software portion 220 and a hardware portion 230.

Software portion 220 may include software designed to control network device 200. Software portion 220 may particularly include a network operating system (OS) 225. For example, network operating system 225 may control hardware portion 230 and may provide an interface for user configuration of network device 200. In general, software portion 220 may implement the functions of the network device that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), and/or other types of dynamic or static storage devices that may store information and instructions for execution by one or more processors 222.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). When network device 200 is a router, hardware portion 230 may, for example, receive incoming packets, extract header information for the packets, and process the packets based on the extracted header information. When network device is a firewall, hardware portion 230 may, for example, receive incoming packets, extract header information from the packets, and match portions of the header information to a lookup table, such as one stored in a ternary content addressable memory, to determine whether the packet should be dropped.

Network device 200 may additionally include one or more input ports 250 for receiving incoming packets and one or more output ports 255 for transmitting an outgoing packet. In some implementations, a port may act as both or one of an input port 250 or an output port 255. Ports 250/255 may also be used to receive remote user connections for configuring the operation of network device 200.

Although network device 200 is shown as including a software portion 220 and a hardware portion 230, network device 200 may, in some implementations, be implemented entirely through hardware. Additionally, network device 200 may include additional, fewer, different, or differently arranged components than those illustrated.

Figure 3:
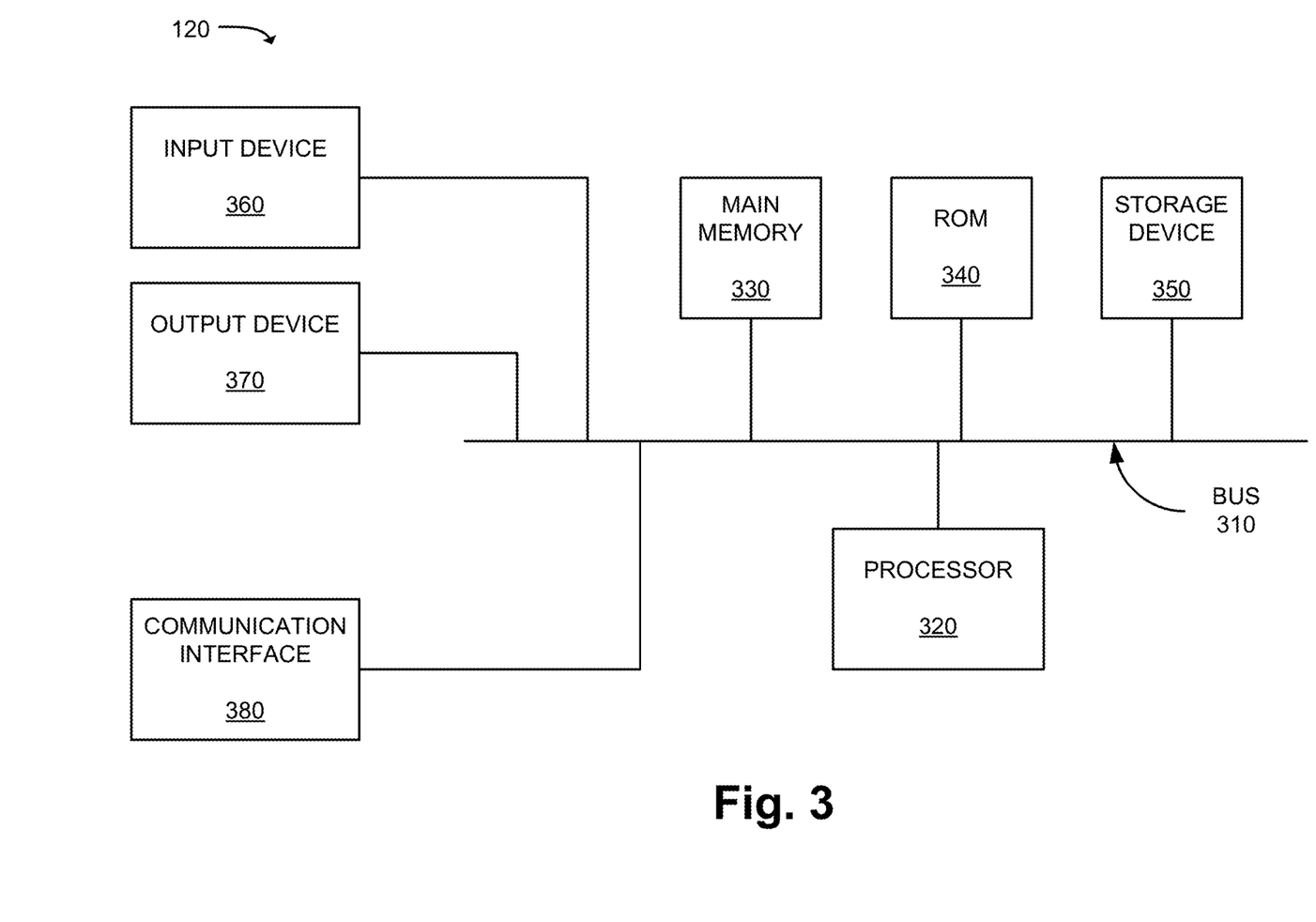
FIG. 3 is a diagram of exemplary components of a computing device.

FIG. 3 is a diagram of exemplary components of computing device 130. As shown in FIG. 3, computing device 130 may include a bus 310, a processor 320, a main memory 330, a read only memory (ROM) 340, a storage device 350, an input device 360, an output device 370, and a communication interface 380. In another implementation, the computing may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As described herein, computing device 130 may perform certain operations in response to processor 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Processor Profiling

Figure 4:
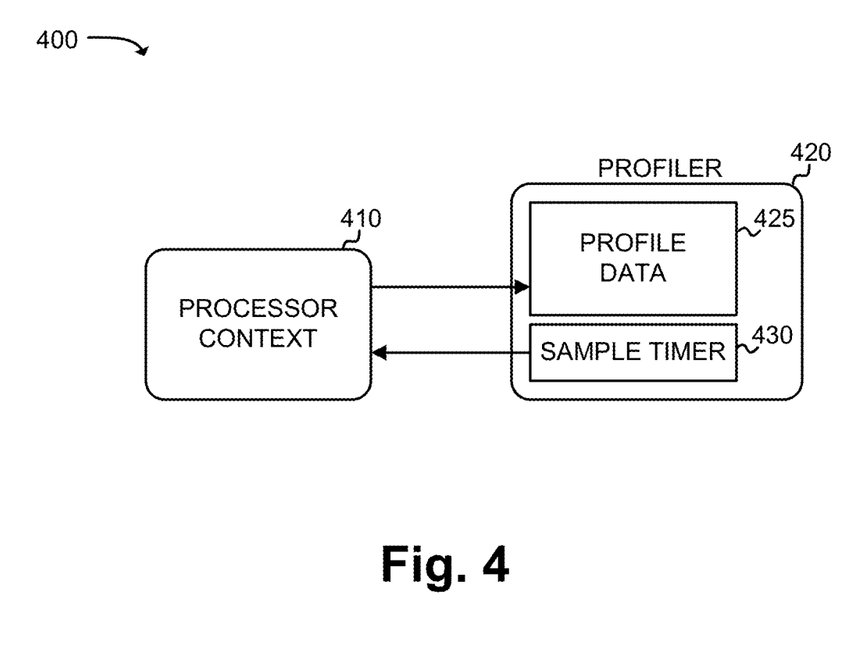
FIG. 4 is a diagram illustrating exemplary functional components of network device or client device.

FIG. 4 is a diagram illustrating exemplary functional components 400 of network device 200 or client device 125. Functional components 400 may generally relate to components used in profiling processes running at network device 200 or client device 125. For example, when developing applications that are to run on software portion 220 of network device 200, it may desirable to profile the processes running under network OS 225 to ensure that none of the processes are "CPU hogs" (i.e., have long executing or running processes) that take up too much time of processor 222. Profiling may be particularly important for non-preemptive kernels. Because these kernels rely on the process to relinquish the processor, a process that consumes an inordinate amount of time can cause problems. For a network device, for example, processes that are CPU hogs can lead to protocol timeouts and connection drops by the network device.

Functional components 400 may include a processor context 410 and a profiler 420. Processor context 410 and profiler 420 may represent processes running, for example, by processor 222 in software portion 220 of network device 200 or by processor 320 of computing device 130. Processor context 410 may represent the process currently being executed by the processor. In one implementation, processor context 410 may be a kernel context, which may refer to a process that executes in a privilege mode in which the process may be able to access all resources of the device and/or execute any instructions supported by the device. It may be particularly important for kernel mode processes in a non-preemptive OS to relinquish control to the OS after a relatively short processing period. In contrast to kernel context process, some processes may be "user mode" processes that have limited execution privileges.

For each active processor context 410, processor 222 (FIG. 2) or processor 320 (FIG. 3) may use an instruction pointer to keep track of a currently executing instruction with the software instructions that define processor context 410. The instruction pointer may include a register that stores the address of the currently executing instruction.

Profiler 420 may profile the operation of one or more processor contexts 410. Profiler 420 may include or be associated with a timer, labeled as sample timer 430. Sample timer 430 may include, for example, a hardware clock that triggers every few milliseconds. Sample timer 430 may produce a periodic signal (a "sampling signal") that triggers profiler 420 to "sample" processor context 410. Sampling processor context 410 may include reading the instruction pointer associated with processor context 410 and storing the value of the instruction pointer in profile data 425. In one implementation, profile data 425 may include a table of possible instruction pointer addresses. Each time profiler 420 samples the instruction pointer, the value of the address corresponding to the sampled instruction pointer may be incremented. In this manner, profile data 425 may represent the amount of time that the processor spends on the various instructions of processor context 410. When analyzing profile data 425, the instruction addresses may be mapped to the process or function corresponding to the instruction, and hence, profile data 425 may be used to determine how much time is spent in the various processes.

In some implementations, some or all of profiler 420 may be implemented in hardware, such as within processor 222 or 320. For example, sample timer 430 and the ability of profiler to 420 to sample the instruction pointer addresses may be implemented in hardware that may execute (run) concurrently with program execution by the processor. In this situation, other, higher-level functions of profiler 420, such as those relating to analysis of profile data 425 may be implemented in software. In other implementations, profiler 420 may be implemented entirely in hardware or entirely in software.

Figure 5:
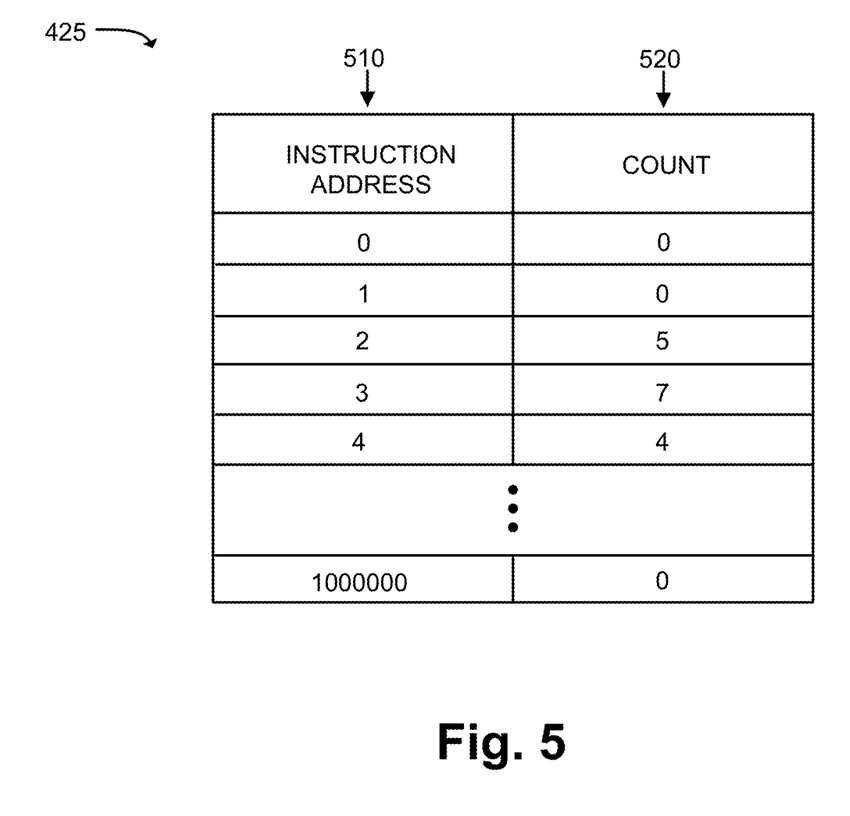
FIG. 5 is a diagram illustrating an exemplary implementation of profile data.

FIG. 5 is a diagram illustrating an exemplary implementation of profile data 425. As shown, profile data 425 may be implemented as a table that relates an instruction address field 510 to a count field 520. Each value in instruction address field 510 may correspond to an instruction address sampled by profiler 420. Count field 510 may store a corresponding indication of the number of samples of each of the instruction addresses. Each time a particular instruction address is sampled, the value in count field 520 corresponding to that address may be incremented. In the particular example shown, instruction addresses zero though 1,000,000 are illustrated. Each address may be associated with a corresponding count value (e.g., address zero is associated with a count of zero, address two is associated with a count of five, etc.).

Although the sampled instruction addresses shown in FIG. 5 are illustrated as corresponding to a set of instructions at all possible addresses in a range, in some implementations, to reduce the storage size of profile data 425, the sampled instruction addresses may be quantized. The instruction addresses may be quantized to the nearest 10, 100, etc. For example, if an instruction pointer when sampled is "s", then the instruction address value against which the address is counted may be the nearest integer to s/100, so that each address within a 100 address range is counted in the sample profile bin. Quantizing the sampling of the instruction pointer in this manner may be sufficient when, for example, the functions that are to be identified by the sampling each span a range of addresses.

Figure 6:
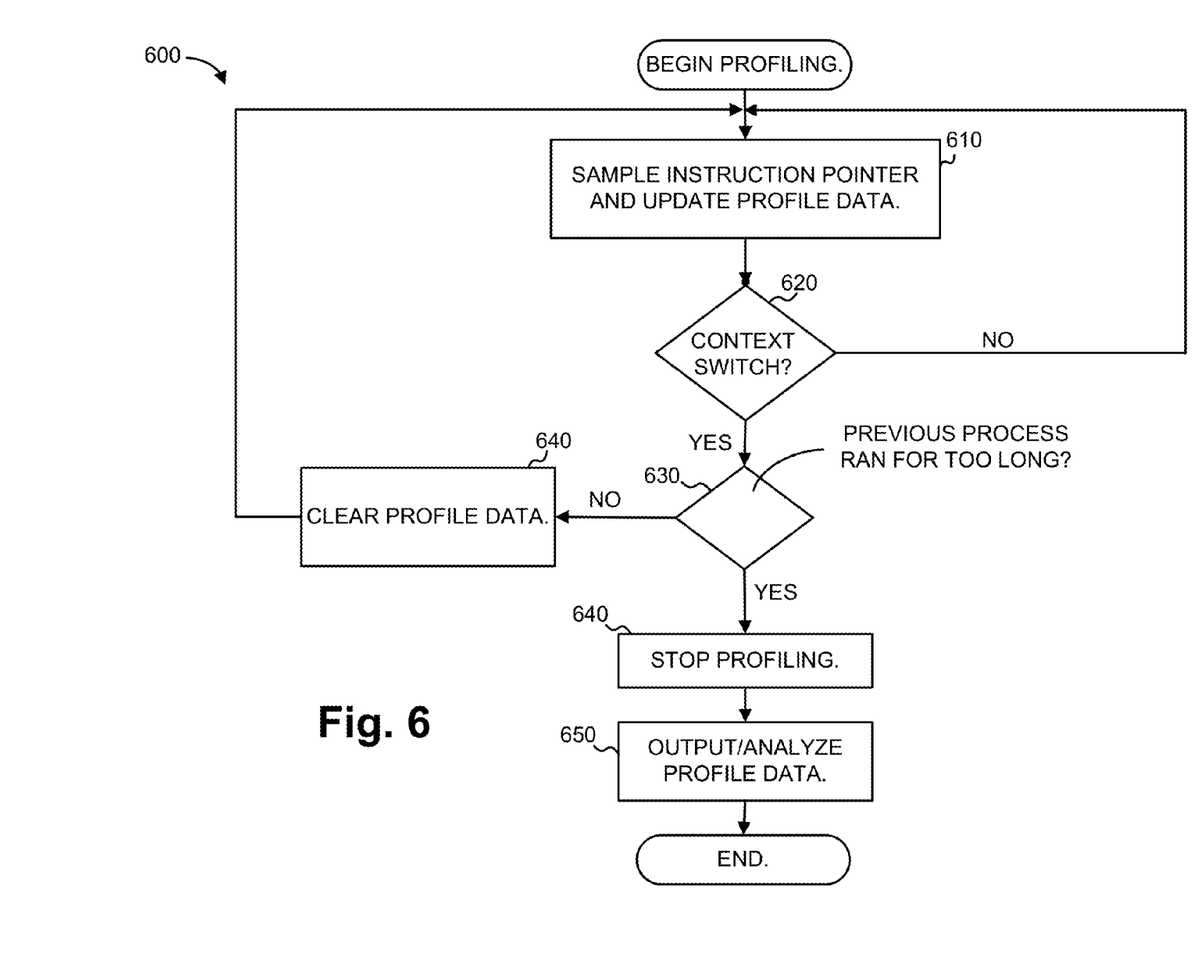
FIG. 6 is a flow chart illustrating exemplary operations performed by a profiler.

FIG. 6 is a flow chart illustrating exemplary operations 600 performed by profiler 420. Operations 600 may be performed by network device 200 or computing device 130 when profiling the execution of processes at the network device 200 or computing device 130. In one particular implementation, operations 600 may be used to profile kernel mode processes executing in a non-preemptive OS so that an operator, such as a programmer, can locate and debug kernel mode processes that take up too much processor time before relinquishing control.

Operations 600 may begin by sampling the instruction pointer and updating profile data 425 (block 610). As previously mentioned, sampling the instruction pointer may include periodically incrementing a counter corresponding to the address of the instruction pointer when it is sampled (e.g., the appropriate count field 520). In this manner, the instruction that is being executed by the processor at the sampling time may be noted. Because the instructions for any particular process are known, the process that is executing at each particular sampling time can also be determined.

At certain points, a context switch may occur (block 620). A context switch, as used herein, refers to switching of the currently executing process, such as a switch that occurs preemptively by the operating system or a switch in which the current process relinquishes control, such as may occur with a non-preemptive operating system.

Profiler 420 may keep track of the running time of the process in the current context. In response to a context switch, (block 620—YES), profiler 420 may determine whether the previous process ran for too long (block 630). In one implementation, determining whether the process ran for too long may include comparing the run time of the process to a user settable threshold length of time. If the run time is above the threshold value, the process may be determined to be running for too long (i.e., the process is a long running process).

When it is determined that the process did not run too long, (block 630—NO), such as may be the case with a normally operating process, profiler 420 may clear profile data 425 (block 640). Clearing profile data 425 may include, for example, zeroing each entry of count field 520 (FIG. 5).

Operations 600 may additionally, include, when the process is determined to be a long running process (block 630—YES), stopping profiling by profiler 420 (block 640). In one implementation, stopping of the profiling may include profiler 420 ceasing to sample the instruction pointer, freezing the operation of sample timer 430, or blocking the updating of profile data 425. In another implementation, "stopping" of the profiling may include storing profile data 425 as a profile "sample," clearing the profile data, and restarting profiling.

In an alternative implementation, instead of immediately stopping profiling of the long running process, profiler 420 may contain to profile the long running process but may then stop profiling when there is a context switch away from the long running process.

At some point, profiling may be complete. Operations 600 may additionally include outputting profile data 425 or outputting information derived from an analysis of profile data 425 (block 650). Because profile data 425 is cleared at each context switch (block 630) and profiling is stopped when a long running process is found, the output profile data may correspond to only profile data corresponding to the long running process(es). In situations in which a user is attempting to identify and debug long running processes, the profile data may include only the relevant data that may be needed in debugging the long running process(es). In contrast, profiling techniques that store profile data for all executing process may make it more difficult to spot and debug long running processes, as information from the other processes may tend to obscure the long running process.

Figure 7A:
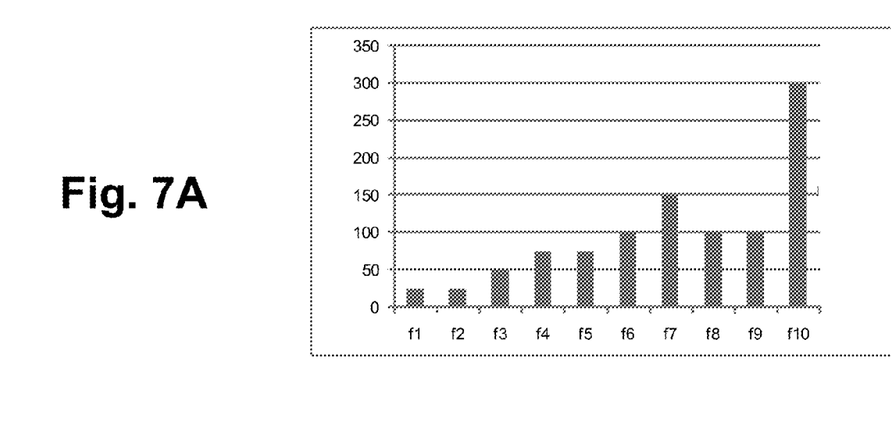
FIGS. 7A and 7B are graphs illustrating the visualization of exemplary profile data.
Figure 7B:
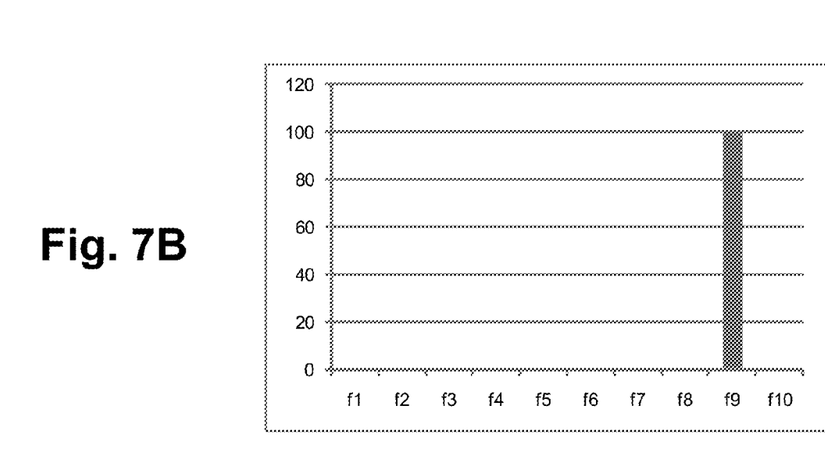

FIGS. 7A and 7B are graphs illustrating visualization of exemplary profile data.

FIG. 7A illustrates profile data collected with a conventional profiling technique, in which profile data may be continuously collected for all running processes. In FIG. 7A, the instruction addresses are mapped to the corresponding functions that contain the addresses. Ten functions are illustrated, function "f1" through "f10". The value corresponding to each function may represent the number of times the function was sampled. Function "f10," for example, may have been sampled 100 times. In this example, assume that the sampling interval of sampling timer 430 is set to 10 ms. Further, assume it is known that at least one of functions f1-f10 is a CPU hog.

From the graph of FIG. 7A, it is not clear which function is the CPU hog. A cursory examination of FIG. 7A may suggest that the CPU hog may be any of functions f6 through f10, while the actual culprit may be different.

FIG. 7B illustrates profile data collected using the technique illustrated in FIG. 6. In FIG. 7B, the sampled instruction addresses may be mapped to the corresponding functions that contain the addresses. Here, assume that the threshold for determining that a process is a long running process is set at one second. Processes that execute for less than one second are not included in the saved profile data. As illustrated in FIG. 7B, the CPU hog, function f9, is clearly visible.

In FIG. 6, the clearing of profile data 425 in response to a context switch was described as being performed by zeroing the count value from all of the instruction pointer addresses. In some situations, zeroing of all the profile data can take a long time relative to the time a process is running. In this situation, network device 200 or computing device 120 may unacceptably be slowed by the clearing of profile data 425. One technique for optimizing the clearing of profile data 425 will next be described.

Figure 8:
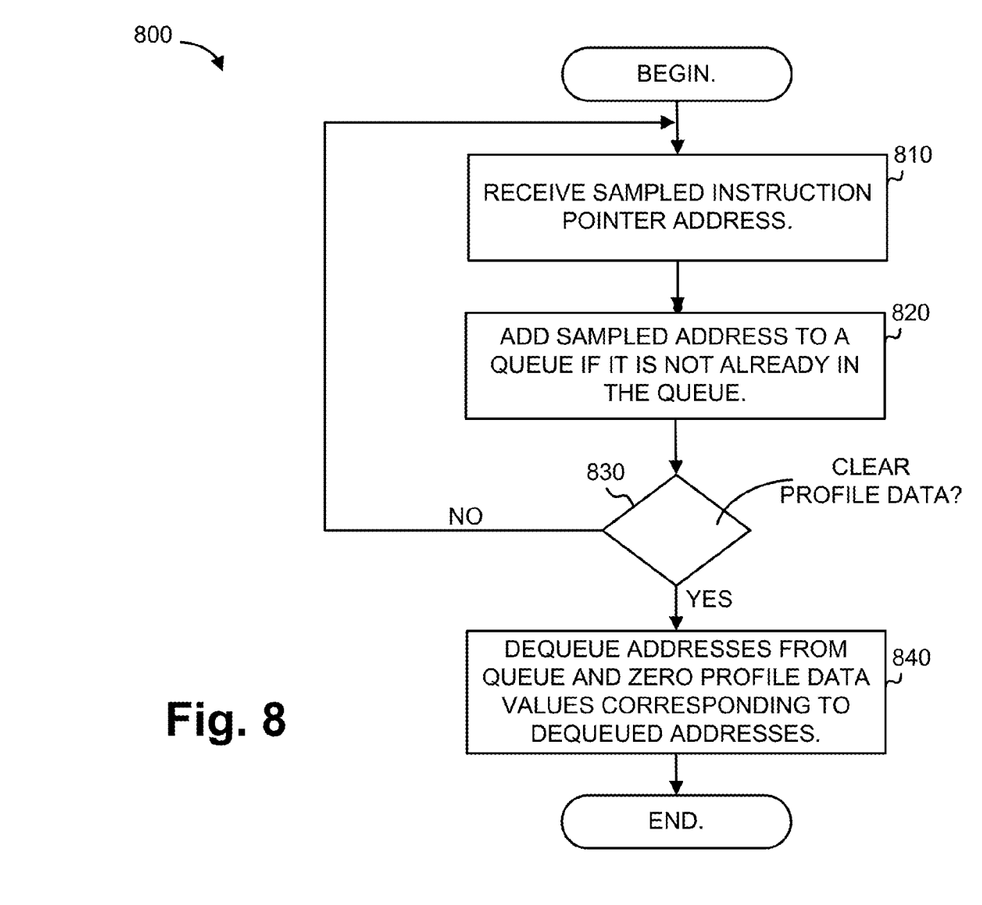
FIG. 8 is a flow chart illustrating exemplary operations that may be performed in regard to clearing profile data.

FIG. 8 is a flow chart illustrating exemplary operations 800 that may be performed in regard to clearing profile data, such as the clearing of profile data, as performed in block 640 (FIG. 6). Operations 800 may be performed by network device 200 or computing device 130 when profiling the execution of processes at the network device 200 or computing device 130.

Operations 800 may include receiving the sampled instruction pointer address (block 810) and adding the sampled instruction pointer address to a queue or other data structure (block 820). The sampled instruction pointer address may be added to the queue only if it is not already in the queue (block 820). In other words, at any given time, the queue should represent a set of all of the unique instruction pointer address samples that were received since the last time the queue was cleared.

Operations 800 may further include determining whether the profile data is to be cleared (block 830). When to clear the profile data was discussed previously with respect to block 640 of FIG. 6. When the profile data is to be cleared, (block 830—YES), the instruction pointer addresses in the queue may be dequeued and the profile data values corresponding to the dequeued addresses may be zeroed (block 840). In this manner, only the count values corresponding to instruction pointer addresses that were stored in the queue are cleared. In situations in which there are a large number of possible count values to clear, by only needing to clear a subset of the possible set of count values, performance in clearing profile data can be improved.

Although a profile was described above in which program execution is sampled based on a sampling timer, the concepts described could be applied to other profiling techniques. For example, some compilers may include an option to compile a program using a profiling enabled flag. When compiled with this program, the program may be instrumented so that every function includes a profiling stub that is executed when the function is called. The profiling stub may operate to record the fact that the function was called, record timestamp information, and/or record other information, such as an identification of the calling function. In the concepts described above, "sampling the instruction pointer" may also include sample the pointer in response to execution of code instrumented to include profiling.

CONCLUSION

As described above, a profiler may analyze processes being run by a processor. The profiler may be set to only collect profile data for certain long running processes based on a user settable threshold value to determine if a process is considered to be a long running process. Because the collected profile data may include data only for the long running processes, it may be easier for a user to spot, analyze, and debug the long running processes.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6 and 8, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    determining, by a device, an instruction pointer address associated with a process that fails to execute for longer than a particular length of time;
    identifying, by the device, a subset of count values, of a set of possible count values, based on the instruction pointer address;
    determining, by the device, that profile data, associated with the process, is to be cleared;
    dequeueing, by the device, the instruction pointer address from a data structure after determining that the profile data is to be cleared,
        the data structure including one or more unique instruction pointer address samples; and
    clearing, by the device, the profile data, associated with the process, by zeroing out the subset of count values without zeroing out one or more other count values of the set of possible count values.

2. The method of claim 1, further comprising:
    receiving information identifying the instruction pointer address;
    determining that the instruction pointer address is not in the data structure; and
    adding the instruction pointer address to the data structure after determining that the instruction pointer address is not in the data structure and before determining the instruction pointer address associated with the process that fails to execute for longer than the particular length of time.

3. The method of claim 1, where the one or more unique instruction pointer address samples were received since a last time that the data structure was cleared.

4. The method of claim 1, where determining the instruction pointer address includes:
    determining a run time of the process,
    determining that the run time is less than the particular length of time, and
    determining the instruction pointer address after determining that the run time is less than the particular length of time.

5. The method of claim 1, where the particular length of time is set by a user associated with the device.

6. The method of claim 1, where determining the instruction pointer address includes:
    determining an occurrence of a context switch associated with the device, and
    determining the instruction pointer address after determining the occurrence of the context switch.

7. The method of claim 6, where determining the occurrence of the context switch includes:
    scheduling the process as an active process that is to be executed, and determining the occurrence of the context switch based on the device switching the active process from the process to another process.

8. The method of claim 1, further comprising:
determining a run time of a different process;
determining that the run time is longer than the particular length of time; and
stopping profiling of the different process after determining that the run time is longer than the particular length of time.

9. The method of claim 8, where stopping profiling of the different process includes:
stopping updating of different profile data associated with the different process.

10. The method of claim 1, further comprising:
determining a different process that executes for longer than the particular length of time; and
stopping profiling of the different process.

11. A device comprising:
one or more processors to:
determine an instruction pointer address associated with a process that fails to execute for longer than a particular length of time;
identify a subset of count values, of a set of possible count values, based on the instruction pointer address;
determine that profile data, associated with the process, is to be cleared;
dequeue the instruction pointer address from a data structure after determining that the profile data is to be cleared,
the data structure including one or more unique instruction pointer address samples; and
clear the profile data, associated with the process, by zeroing out the subset of count values without zeroing out one or more other count values of the set of possible count values.

12. The device of claim 11, where the one or more processors are further to:
schedule the process as an active process that is to be executed by the one or more processors; and
update the profile data while the process is executing.

13. The device of claim 11, where the one or more processors are further to:
sample a value of the subset of count values while the process is executing; and
update the profile data based on the value.

14. The device of claim 11, where, when determining that the profile data is to be cleared, the one or more processors are to:
determine an occurrence of a context switch associated with the process,
determine a run time of the process after determining the occurrence of the context switch,
determine that the run time is less than the particular length of time, and
determine that the profile data is to be cleared based on the run time being less than the particular length of time.

15. The device of claim 11, where the one or more processors are further to:
determine a different process that executes for longer than the particular length of time, and
stop profiling of the different process.

16. A non-transitory computer-readable medium storing instructions, the instructions comprising:
one or more instructions that, when executed by at least one processor of a device, cause the at least one processor to:
determine an instruction pointer address associated with a process that fails to execute for longer than a particular length of time;
identify a subset of count values, of a set of possible count values, based on the instruction pointer address;
determine that profile data, associated with the process, is to be cleared;
dequeue the instruction pointer address from a data structure after determining that the profile data is to be cleared,
the data structure including one or more unique instruction pointer address samples; and
clear the profile data, associated with the process, by zeroing out the subset of count values without zeroing out one or more other count values of the set of possible count values.

17. The non-transitory computer-readable medium of claim 16, where the particular length of time is set by a user associated with the device.

18. The non-transitory computer-readable medium of claim 16, where the one or more instructions to determine the instruction pointer address associated with the process include:
one or more instructions that, when executed by the at least one processor, cause the at least one processor to:
determine an occurrence of a context switch associated with the process,
determine that a run time of the process is less than the particular length of time after determining the occurrence of the context switch, and
determine the instruction pointer address after determining that the run time of the process is less than the particular length of time.

19. The non-transitory computer-readable medium of claim 16, where the instructions further comprise:
one or more instructions that, when executed by the at least one processor, cause the at least one processor to:
receive information identifying the instruction pointer address;
determine that the instruction pointer address is not in the data structure; and
add the instruction pointer address to the data structure after determining that the instruction pointer address is not in the data structure and before determining the instruction pointer address associated with the process that fails to execute for longer than the particular length of time.

20. The non-transitory computer-readable medium of claim 16, where the one or more instructions to determine the instruction pointer address include:
one or more instructions that, when executed by the at least one processor, cause the at least one processor to:
schedule the process as an active process that is to be executed,
determine an occurrence of a context switch based on the at least one processor switching the active process from the process to another process, and
determine the instruction pointer address after determining the occurrence of the context switch.

* * * * *